W. L. COOK.
CAMERA EXPOSURE INDICATOR.
APPLICATION FILED OCT. 27, 1916.

1,250,973.

Patented Dec. 25, 1917.

Inventor:
William Lester Cook
by Davis & Simms
his attorneys

UNITED STATES PATENT OFFICE.

WILLIAM LESTER COOK, OF ROCHESTER, NEW YORK.

CAMERA EXPOSURE-INDICATOR.

1,250,973.

Specification of Letters Patent.    Patented Dec. 25, 1917.

Application filed October 27, 1916. Serial No. 128,044.

*To all whom it may concern:*

Be it known that I, WILLIAM LESTER COOK, a citizen of the United States, and resident of Rochester, in the county of Monroe and State of New York, have invented certain new and useful Improvements in Camera Exposure-Indicators, of which the following is a specification.

The present invention relates to camera exposure indicators and particularly to the type which points out to the user that the sensitized material has not been adjusted after an exposure, an object of the invention being to provide a construction which will coöperate with the numbers or characters on the backing sheet of a film for the purpose of indicating whether the film has been exposed.

To this and other ends the invention consists of certain parts and combinations of parts all of which will be hereinafter described, the novel features being pointed out in the appended claims.

In the drawings:—

Figure 1:
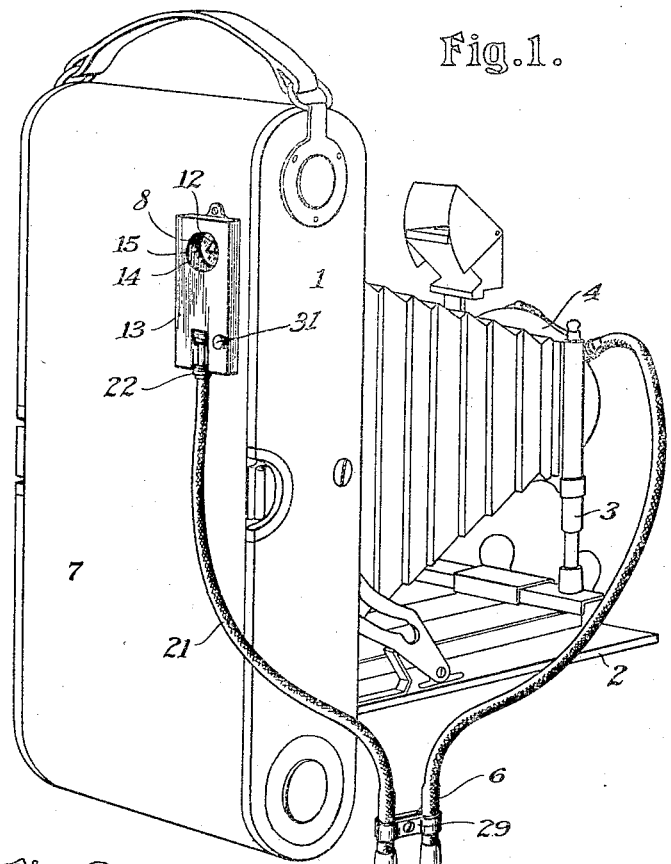
Figure 1 is a perspective view of a folding roll film camera with the present improvements applied thereto.
Figure 5:
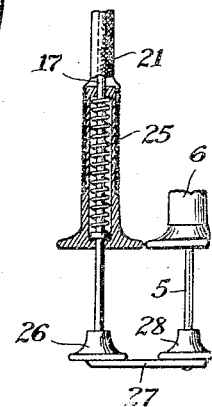
Fig. 5 is a detail view showing the spring for returning the indicating member to normal position.
Figure 2:
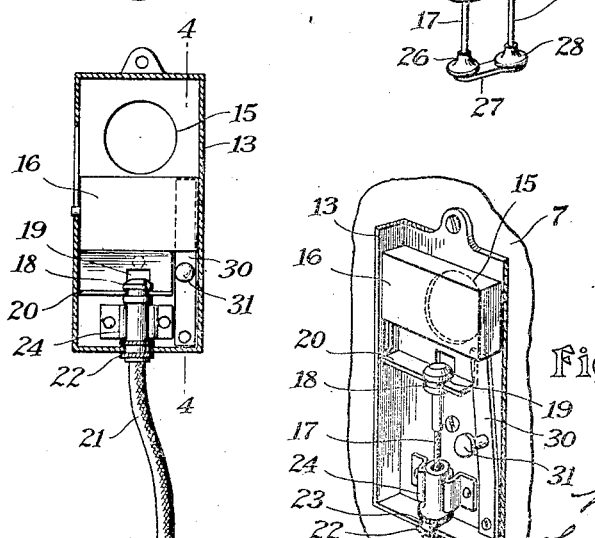
Fig. 2 is an interior view of the indicator.
Figure 3:
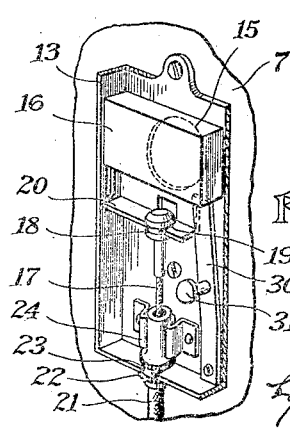
Fig. 3 is an interior perspective view of the indicator showing the indicator member in a position to cover the character on the film backing sheet.
Figure 4:
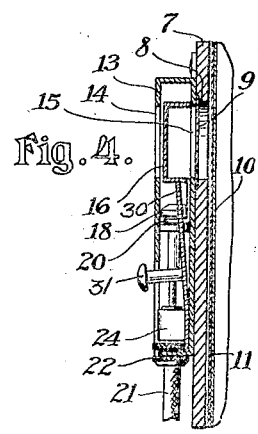
Fig. 4 is a section on the line 4—4, Fig. 2.

A folding roll film camera usually embodies a casing member 1, a hinged front member 2 adapted to serve as a support for the lens board 3. The lens board carries a lens (not shown) and a shutter 4 of any suitable construction, operated generally by a flexible cable 5 surrounded by a sheath 6. The back 7 of the camera is usually provided with an opening 8 closed by a piece of transparent colored celluloid, and the sensitized material 10 is carried within the casing 1 on two spools, generally one at the top and the other at the bottom. Overlying this sensitized material 10 is a backing sheet 11 which is provided with a number of characters 12 usually 1 to 12 for a twelve film roll, and 1 to 6 for a six film roll. These characters are brought opposite the opening 8 in the back 7 and indicate the position of the film and also the number of the film at exposing position.

The purpose of the present invention is to utilize the indicating opening in the back of a camera for indicating whether or not the sensitized material or film at exposing position has been exposed. This is accomplished by controlling an indicating member in such a manner that the latter coöperates with the opening to indicate an exposure upon each actuation of the shutter of the camera.

In the illustrated embodiment of the invention, a small casing 13 is attached to the rear wall 7 of the camera casing and has openings 14 and 15 in front and rear walls respectively coincident with the opening 8 in the back wall 7 of the camera casing. Within this casing 13, an indicating member 16 is mounted, said member preferably being in the form of a slide movable to open or close the openings 14 and 15 and consequently to open and close the opening 8. This slide may be operated in any suitable manner but, in this instance, a flexible cable 17 detachably engages the slide 16 preferably by a grooved head 18 which fits within a notch 19 of an angular extension 20 on the slide.

The flexible operating wire 17 is preferably mounted for longitudinal movement within a sheath 21, the latter being preferably detachably connected to the casing 13 and to this end having an annular grooved portion 22 received within a slot 23 in an end wall of the casing 13, the grooved portion 22 being spaced from one end of the sheath so that said end may be received within a pocket 24 within the casing. The sheath 21 may contain at one end a helical spring 25 which acts on the release wire 17 in such a manner as to hold the indicator 16 normally in non-indicating position. The release wire 21 has a finger piece 26 at its outer end which is adapted to be connected by a cross piece 27 with a finger piece 28 of the release wire 5 of the shutter operator. The sheath 6 of the shutter operator and the sheath 21 of the indicator operator may be connected together near their free ends by a clamp 29, so that when the shutter is operated by pressure on the finger piece 28, the indicator 16 will also be operated through the connection 27 and thereby cover the numeral 12.

When the indicator is operated, a detent 30, in the form of a spring arm arranged within the casing 13 may enter into the path of the indicator 16 and hold the latter in its shifted position until released from the detent 30. The release may be effected by pressure upon the finger piece 31 of the detent, said finger piece extending to the exterior of the casing so that it may be readily manipulated.

The operative position of the camera is shown in Fig. 1. When a picture is to be taken pressure is applied simultaneously to the two finger pieces 26 and 28 through the connection 27. This not only operates the shutter of the camera, but also shifts the indicator 16 to cover the numeral 12 of the backing sheet of the film. The shutter finger piece 28 returns but the finger piece 26 is held against return by the detent 30. Should the user of the camera look at the opening 8 to determine the number of films used and then find the character to be covered by the indicator 16, a notice will be given that the film has not been shifted since the last exposure. Before the film can be shifted, the finger piece 31 must be depressed to permit the indicator to uncover the character on the backing sheet, for unless these characters are visible the distance the film must be shifted cannot be ascertained. Pressure on the finger piece 31 will cause the detent 30 to release the indicator 16 so that the latter will expose the numeral 12. Notice will also be given to the user by the finger piece 26, as the latter will not return to its operative position until the indicator 16 has moved to expose the number 12.

From the foregoing it will be seen that it is impossible to shift the sensitized material accurately until the indicator 16 has been released. The user of the camera will become accustomed to shifting the film immediately after the release of the indicator and in this way double exposures will be prevented. Should the user fail to notice the indicator 16, notice will be given by the finger piece of the release wire of the indicator.

What I claim as my invention and desire to secure by Letters Patent is:—

1. The combination with a roll film camera provided with an opening through which the numbers on the film backing may be observed, of an exposure indicator adapted to coöperate with said opening to indicate an exposure.

2. The combination with a roll film camera provided with an opening through which the numbers on the film backing may be observed, and also provided with a shutter, of an exposure indicator adapted to coöperate with said opening to indicate an exposure and so connected to the shutter as to be moved to indicating position when the shutter is actuated.

3. An exposure indicator for cameras comprising an indicating member adapted to cover the exposed number of a film of a camera, a detent for holding said indicating member in its position covering the number, and a flexible operator for the indicating member.

4. The combination with a roll film camera provided with an opening through which the numbers on a film backing may be observed, and also provided with a shutter, of an exposure indicator adapted to coöperate with said opening to indicate an exposure, and a connection between the shutter and the exposure indicator causing the latter to be moved to indicating position when the shutter is actuated, said connection being detachably connected to the exposure indicator.

5. An exposure indicator for cameras comprising an indicator member for coöperating with the indicating means, a flexible operator connected to the flexible shutter operator and detachably connected to the indicator member, and a manually releasable detent for holding the indicating member in the position to which it is shifted by the flexible operator.

6. An exposure indicator for cameras comprising a casing, a slide guided in the casing to cover and uncover the exposed number on the film, a flexible release wire detachably connected to the slide and a flexible sheath for the release wire detachably connected to the casing.

7. An exposure indicator for cameras comprising a casing having an opening, an indicating member mounted in said casing and adapted to close said opening, a flexible operator connected to said member, a sheath for the operator, and a manually releasable detent for holding the indicating member in a position to close the opening.

WILLIAM LESTER COOK.

Copies of this patent may be obtained for five cents each, by addressing the "Commissioner of Patents, Washington, D. C."